United States Patent
Conrad et al.

(10) Patent No.: US 7,741,415 B2
(45) Date of Patent: Jun. 22, 2010

(54) PROCESS FOR PRODUCING LOW DENSITY POLYETHYLENE COMPOSITIONS AND POLYMERS PRODUCED THEREFROM

(75) Inventors: Christopher W. Conrad, Pearland, TX (US); David T. Gillespie, Pearland, TX (US); Christopher R. Eddy, Missouri City, TX (US)

(73) Assignee: Dow Global Technologies Inc, Midland, MI (US)

( * ) Notice: Subject to any disclaimer, the term of this patent is extended or adjusted under 35 U.S.C. 154(b) by 153 days.

(21) Appl. No.: 11/666,527

(22) PCT Filed: Oct. 4, 2005

(86) PCT No.: PCT/US2005/035566

§ 371 (c)(1),
(2), (4) Date: Apr. 26, 2007

(87) PCT Pub. No.: WO2006/049783

PCT Pub. Date: May 11, 2006

(65) Prior Publication Data

US 2008/0125553 A1 May 29, 2008

(51) Int. Cl.
*C08F 10/02* (2006.01)
*C08F 10/04* (2006.01)
*C08F 10/06* (2006.01)

(52) U.S. Cl. .......................... 526/65; 526/64; 526/348; 526/352; 526/352.2; 526/227; 526/228; 525/52; 525/55; 525/191; 525/240

(58) Field of Classification Search ................ 525/240, 525/55, 52, 191; 526/64, 65
See application file for complete search history.

(56) References Cited

U.S. PATENT DOCUMENTS 3,875,134 A 4/1975 Morikawa at al.

(Continued)

FOREIGN PATENT DOCUMENTS

WO WO-2005/090464 9/2005

OTHER PUBLICATIONS

Karjala et al, ANTEC conference proceedings, Rheological methods for the detection of low levels of long-chain branching in polyolefins, vol. 1, pp. 1018-1022, 2004.

(Continued)

*Primary Examiner*—Vasu Jagannathan
*Assistant Examiner*—Richard A Huhn

(57) ABSTRACT

The present invention relates to an ethylene homo or copolymer characterized as having long chain branching, and having a molecular weight distribution, Mw/Mn, and a GPC-LALLS CDF, which satisfies the following relationship: $y \geq 0.0663x - 0.015$, wherein y=GPC-LALLS CDF and x=Mw/Mn measured by conventional GPC, a line drawn from where the LS chromatogram intersects with molecular weight 350,000 and molecular weight 1,150,000 has a positive slope, preferably with a melt index between 0.15 and 2000 g/10 minutes and having long chain branching. In addition, the invention relates to a free radical initiation polymerization process for the preparation of ethylene polymers or copolymers, comprising reacting ethylene and optionally one or more comonomers at a high pressure, conveniently between 13,000 psig and 100,000 psig, and at reactor temperatures of 115° C. to 400° C., preferably 125-400° C., more preferably 140-350° C., especially 165-320° C., in a reactor system comprising at least one tubular, and at least one autoclave reactor, wherein the monomer(s) feed into the reactors is divided into multiple monomer feed streams, and wherein at least one feed stream into the tubular reactor consists essentially of unreacted monomer.

13 Claims, 6 Drawing Sheets

U.S. PATENT DOCUMENTS

| | | | |
|---|---|---|---|
| 4,988,781 A | | 1/1991 | McKinney et al. |
| 5,272,236 A | * | 12/1993 | Lai et al. ................. 526/348.5 |
| 5,384,373 A | * | 1/1995 | McKinney et al. .......... 526/212 |
| 5,494,965 A | * | 2/1996 | Harlin et al. ................... 525/52 |
| 6,407,191 B1 | * | 6/2002 | Mezquita et al. ............ 526/227 |
| 2003/0139551 A1 | | 7/2003 | Chai |
| 2003/0213938 A1 | | 11/2003 | Farley et al. |

OTHER PUBLICATIONS

Sammler et al, Zero-Shear Viscosity/molecular weight method for the detection of long-chain branching in polyolefins, Vo. 1, pp. 1023-1027, 2004.

Zimm, Journal of Chemical Physics, vol. 16, No. 12, Dec. 1948, entitled "Apparatus and Methods for Measurement and Interpretation of the Angular Variation of Light Scattering; Preliminary Results on Polystyrene Solutions".

* cited by examiner

PROCESS FOR PRODUCING LOW DENSITY POLYETHYLENE COMPOSITIONS AND POLYMERS PRODUCED THEREFROM

The present invention relates to ethylene homo and copolymers, and more in particular to LDPE-type (low density polyethylene) resins. For many years, LDPE has been produced on autoclave reactors or in tubular reactors. Each type of reactor has its advantages, but economics and product design drive the need for improvements. The operation of and type(s) of reactor(s) employed can dramatically affect the physical properties of the resulting LDPE. Such improvements are desired for applications such as blown and cast film, where especially good optical properties (for example, low gels, especially microgels) are desired. We have discovered a novel polymerization process to make LDPE, and that the resulting LDPE itself has a combination of physical properties heretofore never known.

It is a first object of the present invention to provide ethylene homo and copolymers characterized as having long chain branching, and having a molecular weight distribution, Mw/Mn, and a GPC-LALLS CDF which satisfies the following relationship $y \geq 0.0663x - 0.015$, wherein y=GPC-LALLS CDF and x=Mw/Mn measured by conventional GPC, and wherein a line drawn from where the LS chromatogram intersects with molecular weight 350,000 and molecular weight 1,150,000 has a positive slope.

The polymers of the invention have long chain branching as evidenced by having a GPC Mw and a zero shear viscosity ($\eta_0$) (Pa*s) relationship of $\log(\eta_0 (Pa*s)) \leq 3.6607*\log(GPC\ Mw) - 14.678$. Zero shear viscosity is determined by creep as discussed in Karjala, T. P., R. L. Sammler, W. Huang, M. A. Mangnus, and M. S. Johnson, "Rheological Methods for the Detection of Low Levels of Long-Chain Branching in Polyolefins", SPE ANTEC Proceedings, Chicago, p. 1018, May 17-20 (2004) and in Sammler, R. L., T. P. Karjala, W. Huang, M. A. Mangnus, L. G. Hazlitt, and M. S. Johnson, "Zero-Shear Viscosity/Molecular Weight Method for the Detection of Long-Chain Branching in Polyolefins", SPE ANTEC Proceedings, Chicago, p. 1023, May 17-20 (2004). The ethylene homo and copolymers preferably have a microgel content of less than or equal to 3000 count (having an average diameter of 200 to 400 micrometers/50,000 square inches of film area). The ethylene homo and copolymers can have a melt index of 0.15 to 2000 g/10 minutes, preferably from 0.15 to 20, and especially from 0.2 to 8 g/10 minutes.

The ethylene homo and copolymers of the invention can have a molecular weight distribution, Mw/Mn, of between 2 and 7, preferably from 4 to 7.

It is another object of the present invention to provide a free radical initiation polymerization process for the preparation of ethylene polymers or copolymers, comprising reacting ethylene and optionally one or more comonomers at a high pressure, conveniently between 13,000 psig and 100,000 psig, and at reactor temperatures of 115° C. to 400° C., preferably 125-400° C., more preferably 140-350° C., especially 165-320° C., in a reactor system comprising at least one tubular, and at least one autoclave reactor, wherein the monomer(s) feed into the reactors is divided into multiple monomer feed streams, and wherein at least one feed stream into the tubular reactor comprises unreacted monomer or preferably consists essentially of unreacted monomer.

The process can use a combination of autoclave and tubular reactors, operated in series, in that sequential order (that is, the autoclave reactor followed by the tubular reactor) wherein the monomer(s) feed into each reactor is divided into multiple monomer feed streams.

The process can also use a combination of autoclave and tubular reactors, preferably operated in series in that sequential order, wherein the monomer(s) feed into each reactor is divided into multiple monomer feed streams, wherein each monomer feed stream is at a temperature lower than that of the reactor temperature.

The maximum monomer feed stream split to the tubular reactor can be defined by $y = 1 - (0.35)^x$ wherein y represents the maximum monomer feed to the tubular reactor as a fraction of total reactor feed and x represents the total number of feeds to the tubular reactor.

According to a further aspect, there is provided a free radical initiation polymerization process for the preparation of ethylene homopolymers or copolymers, using autoclave and tubular reactor combinations where monomer(s) feed is split to the tubular section of the reactor at a fraction maximally defined by $y = 1 - (0.35)^x$ wherein y represents the maximum monomer feed to the tubular reactor as a fraction of total reactor feed and x represents the total number of feeds to the tubular reactor. Producing polymer under these conditions gives advantages in product flexibility and may increase conversion depending on product type.

Figure 4:
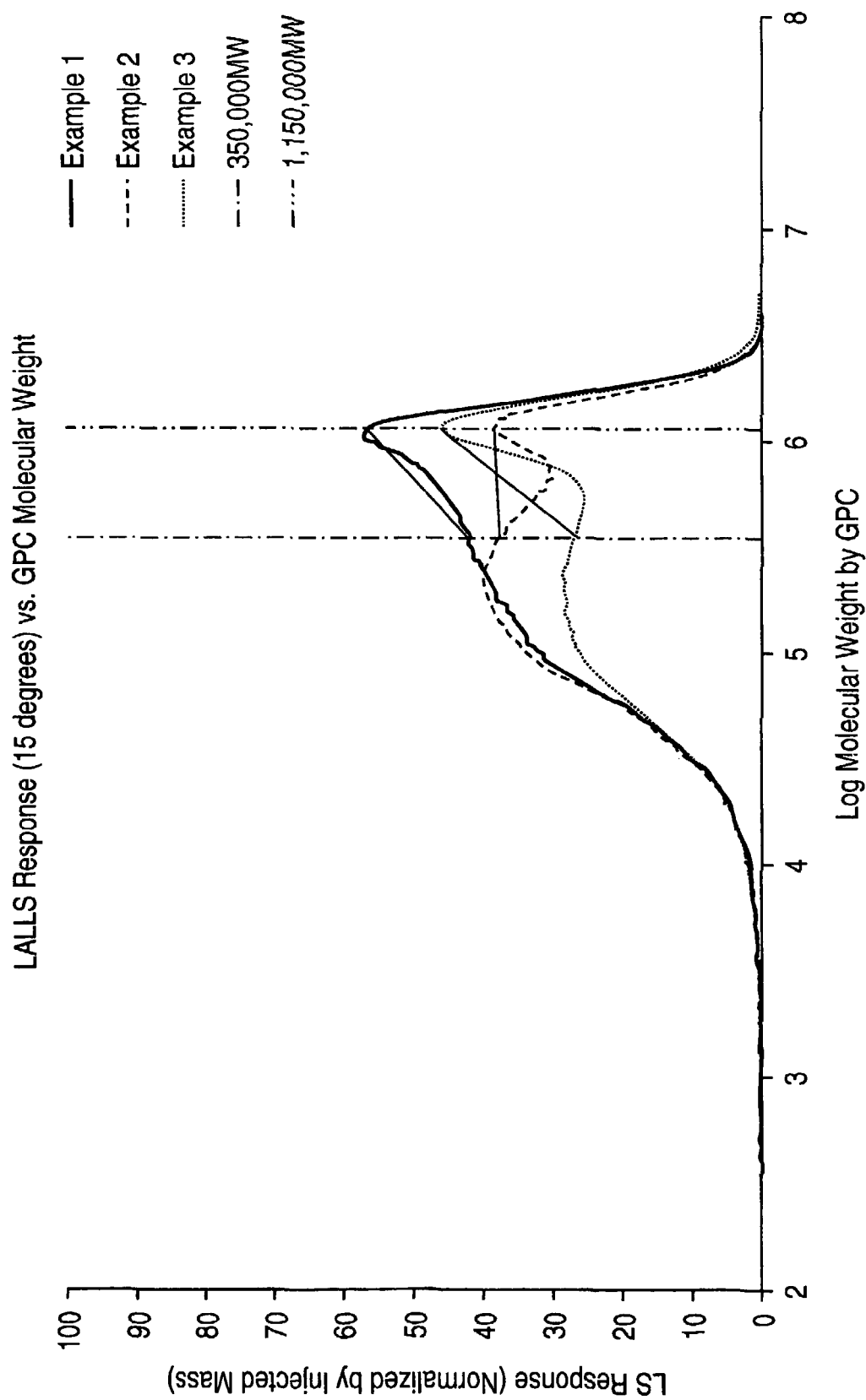

FIG. 4 graphically depicts the light scattering response (LS response) versus log molecular weight (by gel permeation chromatography (GPC)) for Examples 1, 2 and 3.

Figure 5:
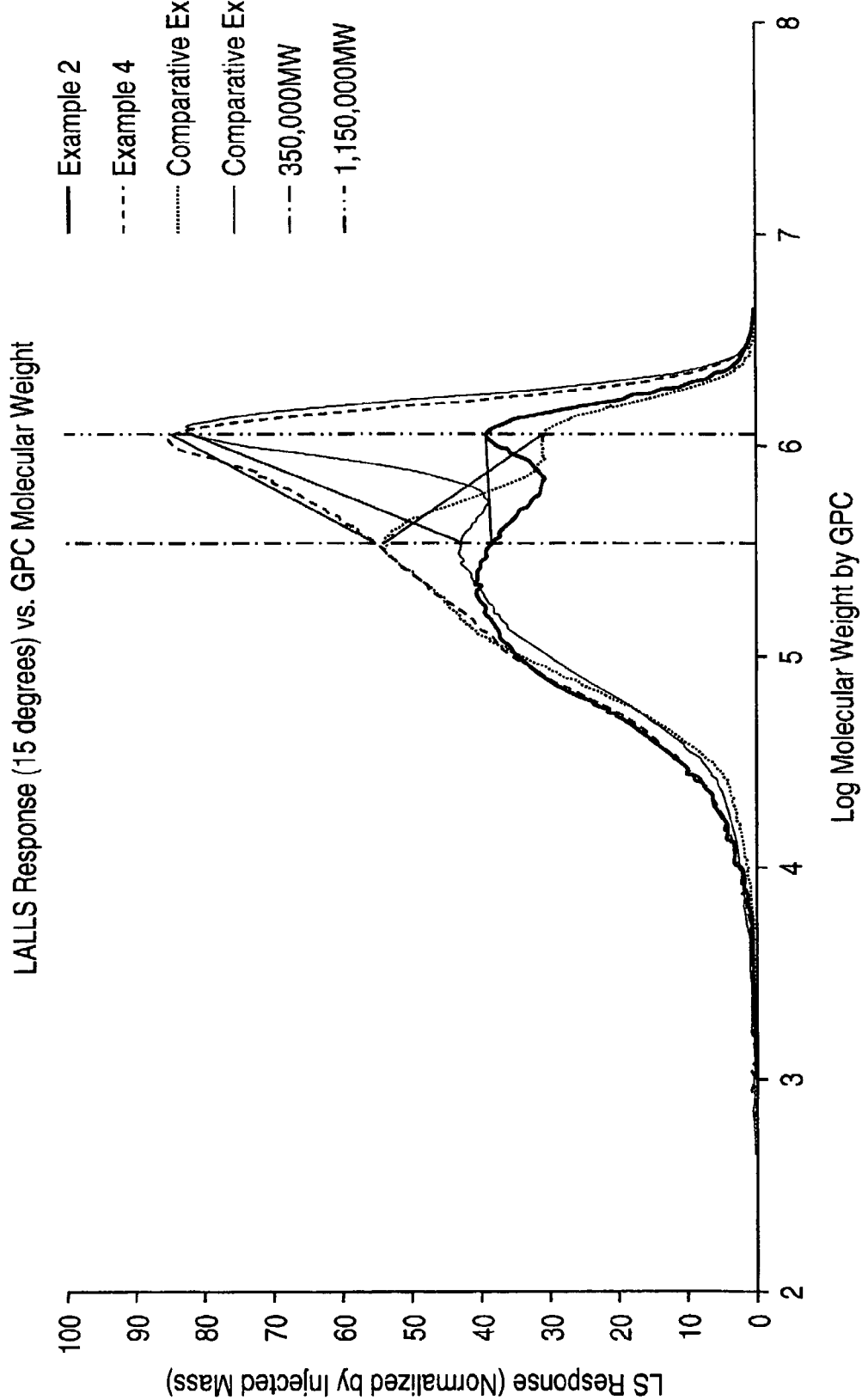

FIG. 5 graphically depicts the light scattering response (LS response) versus log molecular weight (by gel permeation chromatography (GPC)) for Examples 2 and 4, as well as comparative examples 1 and 2.

Figure 6:
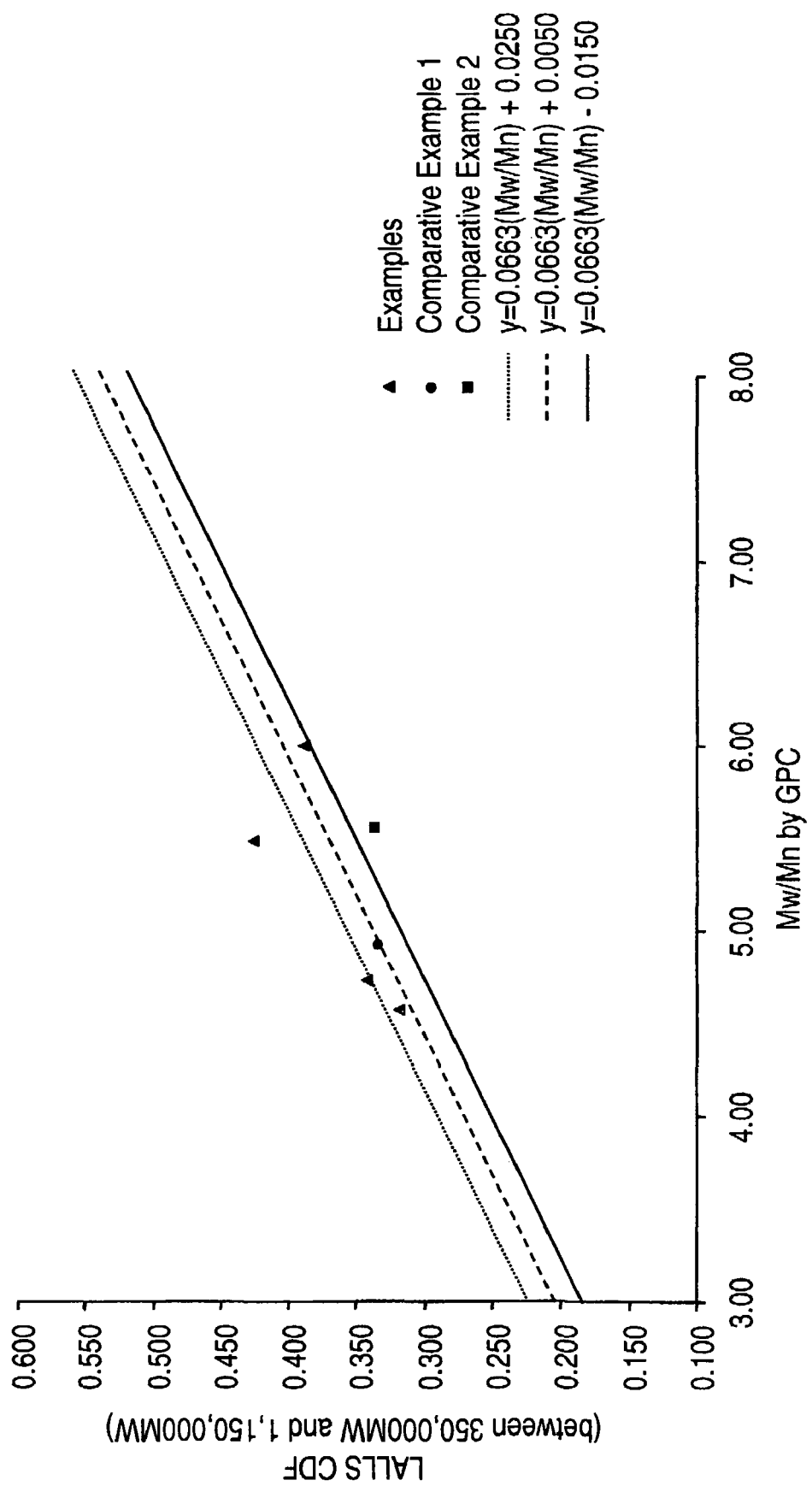

FIG. 6 graphically depicts the laser light scattering (LA-LLS) cumulative detector fraction (CDF) versus molecular weight distribution (GPC) for Examples 1-4 as well as comparative examples 1 and 2.

The present invention relates to a high pressure ethylene homo or copolymerization process and to maintaining a CDF vs. Mw/Mn (also known as polydispersity or PDI) relationship of $y \geq 0.0663x - 0.015$, wherein y=GPC-LALLS CDF and x=Mw/Mn measured by conventional GPC, and wherein a line drawn from where the LS chromatogram intersects with molecular weight 350,000 and molecular weight 1,150,000 has a positive slope, having long chain branching and maintaining a microgel content below 3000 count, where microgels are defined as being in the range of 200-400 micron gels per 50,000 square inches of film area.

These polymers can, for instance, be prepared in high pressure radical initiated polymerization processes, wherein a wide variety of different chain transfer agents and/or comonomers may be used. Typical chain transfer agents that can be used include, but not limited to propylene, isobutane, n-butane, 1-butene, methyl ethyl ketone, propionldehyde, isopar, and isopropanol. Typical comonomers that can be used include, but not limited to propylene, 1-butene, acrylic acid, methacrylic acid, vinyl acetate, silane, styrene, ethyl acrylate, and carbon monoxide.

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of said chain. These agents can be of many different types, from saturated hydrocarbons or unsaturated hydrocarbons to aldehydes, ketones or alcohols.

The melt index (MI or $I_2$) of a polymer, which is related to molecular weight, is controlled by controlling the concentration of the chain transfer agent. After the donation of a hydrogen atom, the chain transfer agent forms a radical which can react with the monomers, or with already formed oligomers or polymers, to start a new polymer chain. This means that any functional groups present in chain transfer agents will be introduced in the polymer chains.

A large number of chain transfer agents, for example propylene and 1-butene which have an olefinically unsaturated bond, can also be incorporated in the polymer chain, themselves, via a copolymerization reaction. In many processes, two types of chain transfer agents are used in order to control both the MI and the density of the polymers prepared.

The melt index of the product polymer can be controlled by varying the amount of chain transfer agent present during the polymerization, usually by mixing varying amounts of transfer agent with the monomer or the mixture of monomers prior to polymerization. Polymers produced in the presence of chain transfer agents are modified in a number of physical properties such as processability, optical properties such as haze and clarity, density, stiffness, yield point, film draw and tear strength.

Such polymer products having a narrow MWD are very suitable for the production of high clarity LDPE blown and cast films, however extrusion coating applications often require polymers having broader molecular weight distributions. The typical process known in the art to make narrow MWD material involves the use of tubular reactors with conversion rates of maximally 30-40 percent due to high reaction temperatures and high reaction pressures to produce these products. Conventional autoclave reactors may also produce narrow MWD at maximally 15-19 percent conversion. The process of the present invention is therefore somewhat counterintuitive.

Gel Determination

The following procedure can be used to determine the gel content of polymers:

Polymer pellets are extruded into a film. The gel counter images, detects and then sizes the gels present in the film. The gel counter consists of a light source, line scan camera (CCD detector) and an image processor. The gel counter is configured in transmission mode, with the film passing between the light source and the camera. An Optical Control Systems (OCS) FS3 camera is used.

Figure 1:
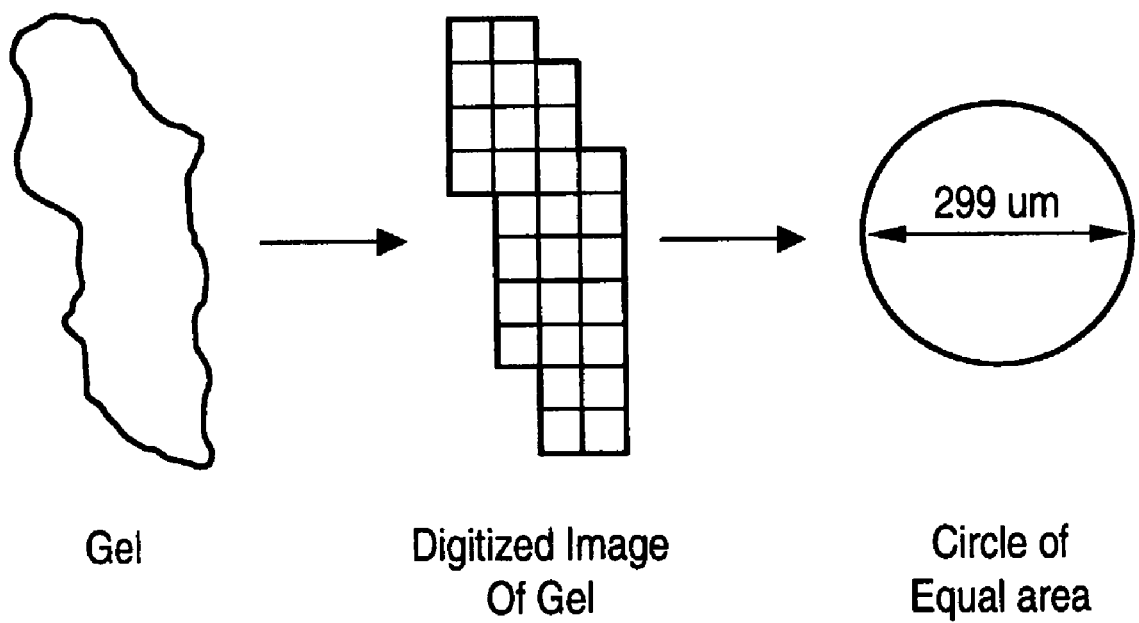
FIG. 1 is a graphic representation of the process used to determine equivalent circular diameter for irregular shaped gels.

The film is illuminated with the light source. The camera measures the intensity of the transmitted light. Gels will refract the light reducing the amount of light reaching the camera. A digitized image of the gel is created. Its area is determined by summing the number of picture elements (pixels) it includes. The diameter of the gel is assigned by calculating the diameter of a circle with an area equivalent to the measured gel area (equivalent circular diameter). This process is depicted graphically in FIG. 1.

Based on this derived diameter, the gels are grouped into size classes as follows:

| Parameter | Diameter Range |
|---|---|
| Microgels | 200-400 μm |
| Small Gels | 400-800 μm |
| Medium Gels | 800-1600 μm |
| Large Gels | >1600 μm |

Gel: A nodule of any material present in the polymer film. The properties of the nodule are such that it does not blend into the film matrix. The present method does not distinguish between polymeric and non-polymeric nodules.

The camera will detect any passing medium or large gel. However, such gels are rare. Consequently, the observed numbers of gels will show significant statistical fluctuations.

One analysis cycle inspects 50,000 inches$^2$ of film. The film thickness is 3 mil and the bubble diameter is 6 inches.

Film Fabrication: Gel counts are based on blown film. The bubble should be maintained at 6 inches in diameter and 3 mils thick. All gel counts are classified by size and reported per 50,000 in$^2$.

Molecular Architecture Determination

In order to determine the molecular architecture of various polymer compositions, the following procedure is used:

The chromatographic system consists of a Waters (Millford, Mass.) 150 C high temperature chromatograph equipped with a Precision Detectors (Amherst, Mass.) 2-angle laser light scattering detector Model 2040. The 15-degree angle of the light scattering detector is used for calculation purposes. Data collection is performed using Viscotek TriSEC software version 3 and a 4-channel Viscotek Data Manager DM400. The system is equipped with an on-line solvent degas device from Polymer Laboratories.

The carousel compartment was operated at 140° C. and the column compartment is operated at 150° C. The columns used are 4 Shodex HT 806M 30 cm 13-micron columns and 1 Shodex HT803 15 cm 13-um column. The solvent used is 1,2,4 trichlorobenzene. The samples are prepared at a concentration of 0.1 grams of polymer in 50 milliliters of solvent. The chromatographic solvent and the sample preparation solvent contain 200 ppm of butylated hydroxytoluene (BHT). Both solvent sources are nitrogen sparged. Polyethylene samples are stirred gently at 160 degrees Celsius for 4 hours. The injection volume used is 200 microliters and the flow rate is 0.67 milliliters/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80 degrees Celsius with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):

$$M\text{polyethylene} = A \times (M\text{polystyrene})^B$$

Where M is the molecular weight, A has a value of 0.41 and B is equal to 1.0.

A fourth order polynomial is used to fit the respective polyethylene-equivalent calibration points.

The total plate count of the GPC column set is performed with Eicosane (prepared at 0.04 g in 50 milliliters of TCB and dissolves for 20 minutes with gentle agitation.) The plate count and symmetry are measured on a 200 microliter injection according to the following equations:

PlateCount=5.54*(RV at Peak Maximum/(Peak width at ½ height))$^2$

Where RV is the retention volume in milliliters and the peak width is in milliliters.

Symmetry=(Rear peak width at one tenth height−RV at Peak maximum)/(RV at Peak Maximum−Front peak width at one tenth height)

Where RV is the retention volume in milliliters and the peak width is in milliliters.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight is obtained from the sample refractive index area and the refractive index detector calibration from a linear polyethylene homopolymer of 115,000 molecular weight. The chromatographic concentrations are assumed low enough to eliminate addressing 2nd Virial coefficient effects (concentration effects on molecular weight).

In order to monitor the deviations over time, which may contain an elution component (caused by chromatographic changes) and a flow rate component (caused by pump changes), a late eluting narrow peak is generally used as a "marker peak". A flow rate marker is therefore established based on the air peak mismatch between the degassed chromatographic system solvent and the elution sample on one of the polystyrene cocktail mixtures. This flow rate marker is used to linearly correct the flow rate for all samples by alignment of the air peaks. Any changes in the time of the marker peak are then assumed to be related to a linear shift in both flow rate and chromatographic slope.

To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (as a measurement of the calibration slope) is calculated as Equation 1. In a high-temperature SEC system, an antioxidant mismatch peak or an air peak (if the mobile phase is sufficiently degassed) can be used as an effective flow marker. The primary features of an effective flow rate marker are as follows: the flow marker should be mono-dispersed. The flow marker should elute close to the total column permeation volume. The flow marker should not interfere with the chromatographic integration window of the sample.

Flowrateeffective=Flowratenominal*FlowMarker Calibration/FlowmarkerObserved    Equation 1

The preferred column set is of 13 micron particle size and "mixed" porosity to adequately separate the highest molecular weight fractions appropriate to the claims.

Figure 2:
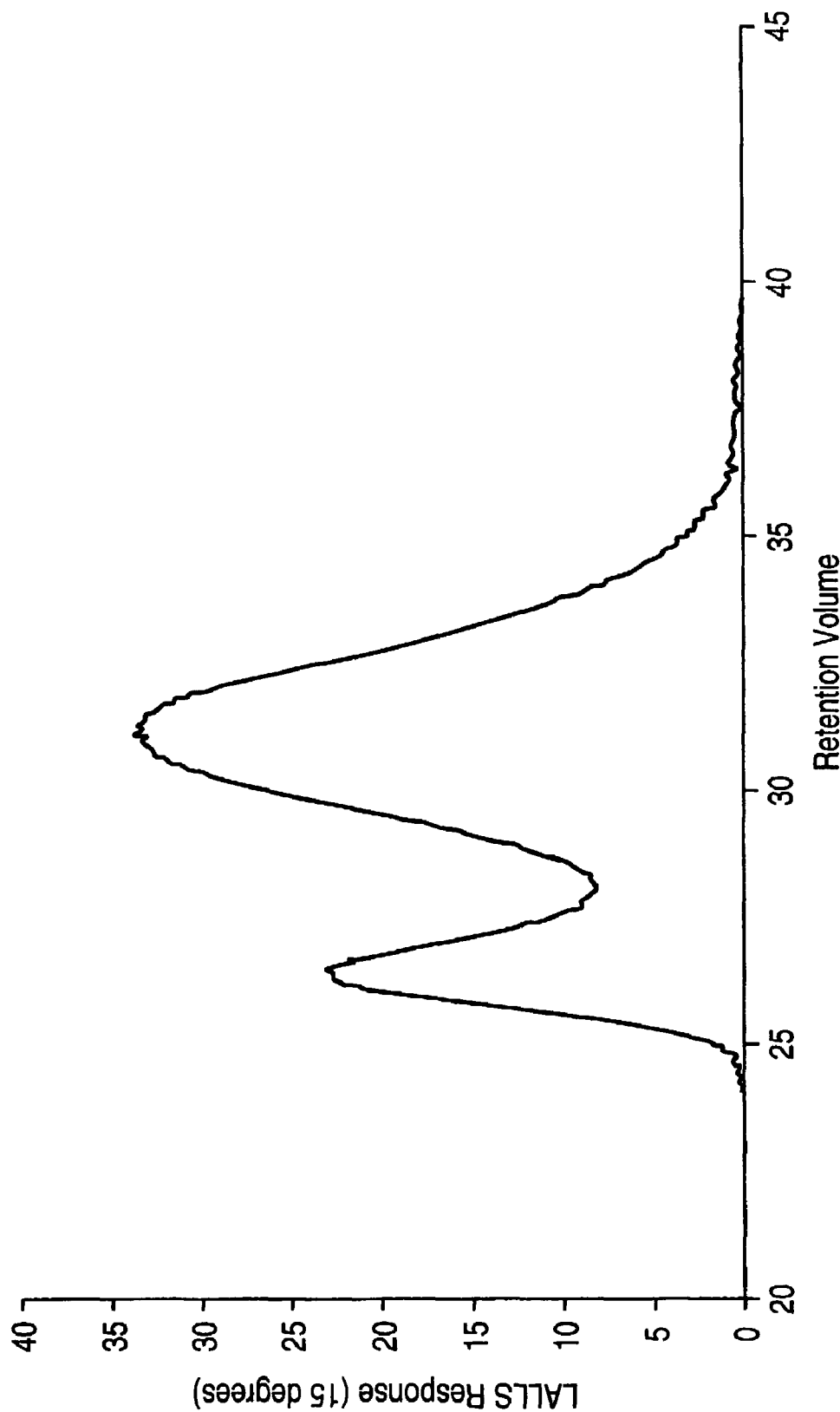
FIG. 2 is an example of an appropriate light scattering chromatogram for the verification of adequate column separation and appropriate shear rate for GPC.

The verification of adequate column separation and appropriate shear rate can be made by viewing the low angle (less than 20 degrees) of the on-line light scattering detector on an NBS 1476 high pressure low density polyethylene standard. The appropriate light scattering chromatogram should appear bimodal (very high MW peak and moderate molecular weight peak) as shown in FIG. 2 below. There should be adequate separation by demonstrating a trough height between the two peaks less than half of the total LS peak height. The plate count for the chromatographic system (based on eicosane as discussed previously) should be greater than 32,000 and symmetry should be between 1.00 and 1.12. The CDF(LS) fraction of NBS 1476 between 350,000 and 1,150,000 molecular weight is calculated as approximately 0.175. It should be noted that 1,150,000 occurs at approximately the LALLS high molecular weight peak position.

LS Detection of NBS 1476

The calculation of the cumulative detector fractions (CDF) for the refractometer ("CDF RI") and the low angle laser light scattering detector ("CDF LS") are accomplished by the following steps:

1) Linearly flow correct the chromatogram based on the relative retention volume ratio of the air peak between the sample and that of a consistent narrow standards cocktail mixture.

2) Correct the light scattering detector offset relative to the refractometer as described in the calibration section.

3) Subtract baselines from the light scattering and refractometer chromatograms and set integration windows making certain to integrate all of the low molecular weight retention volume range in the light scattering chromatogram that is observable from the refractometer chromatogram.

4) Calculate the molecular weights at each data slice based on the polystyrene calibration curve, modified by the polystyrene to polyethylene conversion factor (0.41) as described in the calibration section.

5) Calculate the cumulative detector fraction (CDF) of the LALLS chromatogram (CDFLS) based on its baseline-subtracted peak height (H) from high to low molecular weight (low to high retention volume) at each data slice (i) according to the following equation:

$$CDF_i = \frac{\sum_{j=LowestRVindex}^{i} H_j}{\sum_{j=LowestRVindex}^{HighestRVindex} H_j}$$

where i is between the LowestRVindex and the HighestRVindex

6) A plot of CDF versus molecular weight is obtained by calculating the CDF at each integrated data slice from step (5) and plotting it versus the log of the polyethylene equivalent molecular weight at each integrated data slice from step (4).

7) The range over which the "CDF" (cumulative detector fraction) is selected for this particular invention is from molecular weight of 350,000 to 1,150,000. The slope of this region is also important for this invention; the slope is determined by a line drawn from where the LS chromatogram intersects with molecular weight 350,000 and molecular weight 1,150,000 and needs to be positive. CDF for NBS 1476 is about 0.175 for the molecular weight range of 350,000 to 1,150,000, and NBS 1476 also has a positive slope between these two molecular weight points.

The melt index ($I_2$) (grams/10 minutes) is determined in accordance with ASTM D1238, condition (E) (190° C./2.16 kg). Densities of the polymer products are determined in accordance with ASTM D-792.

The polymers of the invention preferably have a melt strength (in centiNewtons) greater than or equal to $7.5*(\text{melt index(measured in grams/10 minutes)})^{-0.6}$, preferably greater than or equal to $9.5*(\text{melt index})^{-0.6}$, more preferably greater than or equal to $11.5*(\text{melt index})^{-0.6}$, and preferentially have a molecular weight distribution of between 2 and 7.

"Melt strength" which is also referred to in the relevant art as "melt tension" is defined and quantified herein to mean the stress or force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E. Melt strength values, which are reported herein in centi-Newtons (cN), are determined using a Gottfert Rheotens at 190° C.

The term ethylene copolymer as used in the present description and the claims refers to polymers of ethylene and, optionally, one or more comonomers. Suitable comonomers to be used in the ethylene polymers of the present invention and giving the same trends in polymer properties, are, for instance, ethylenically unsaturated monomers and especially $C_3$ to $C_{20}$ alpha-olefins, acetylenic compounds, conjugated or nonconjugated dienes, polyenes, carbon monoxide, (meth)acrylic acid, vinyl acetate, styrene, and $C_2$ to $C_6$ alkyl acrylates.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 13,000 psig with the use of free-radical initiators, such as peroxides (see for example U.S. Pat. No. 4,599,392, herein incorporated by reference).

The polymers of the present invention have a weight average molecular weight of between less than 5,000 up to 500,000 and more, and preferably between 10,000 and 250,000.

The process of the present invention is carried out at a high pressure, which means in the context of the present invention that the reaction pressure is at least 13,000 psig, conveniently between 17,000 psig and 45,000 psig.

The process of the present invention is a free radical polymerization process. The type of free radical initiator to be used in the present process is not critical. Free radical initiators that are generally used for such processes are oxygen, which is usable in tubular reactors in conventional amounts of between 0.0001 and 0.005 wt. percent drawn to the weight of polymerizable monomer, and organic peroxides. Preferred initiators are t-butyl peroxy pivalate, di-t-butyl peroxide, t-butyl peroxy acetate and t-butyl peroxy-2-hexanoate or mixtures thereof. These organic peroxy initiators are used in conventional amounts of between 0.005 and 0.2 wt. percent drawn to the weight of polymerizable monomers. The amount of chain transfer agent used in the process of the present invention generally lies between 0.03 and 10.0 percent by weight of the total reaction mixture, and preferably between 0.5 and 3.5 wt. percent.

For high pressure, free radical initiated polymerization processes, two basic types of reactors are known from the prior art. In the first type, an agitated autoclave vessel having one or more reaction zones is used: the autoclave reactor. In the second type, a jacketed tube is used as a reactor, which tube has one or more reaction zones: the tubular reactor. The beginning of a reaction zone is defined by the side injection of either initiator of reaction, ethylene, telomer, comonomer(s) as well as any combination thereof. The high pressure process of the present invention giving polyethylene homo or copolymers having the advantageous properties as found in accordance with the invention, can be carried out in an autoclave reactor having at least 1 reaction zone or in a combination of an autoclave and a tubular reactor, each comprising one or more reaction zones.

In the present process, the pressure in the autoclave reactor, which contains more than one reaction zone, is relatively high as compared with prior art processes using autoclave reactors, and is preferably between 17,000 and 45,000 psig. In the most preferred embodiment, the reactor pressure is at least 24,000 psig, for example 26,500 psig.

The high pressure values used in the process of the invention have a direct effect on the molecular weight distribution of the polymer and the GPC-LALLS CDF fraction. Generally, the higher the reaction pressure is, the lower the molecular weight distribution provided the reaction is occurring in single phase conditions. In a preferred embodiment of the process of the invention a combination of an autoclave comprising at least one reaction zone and a conventional tubular reactor having at least one reaction zone is used. Such a conventional tubular reactor is cooled by an external water jacket and has at least one injection point for initiator and/or monomer and/or chain transfer agent.

Suitable, but not limiting, reactor lengths can be between 100 and 3000 meters, preferably between 200 and 300 meters. The autoclave reactor normally has several injection points for initiator and/or monomer. The particular reactor combination used allows conversion rates of about 20 percent or higher, which is significantly higher than the conversion rates obtained for standard autoclave reactors, which allow typical conversion rates of 16 to 18 percent, expressed as ethylene conversion, for the production of polymers in the molecular weight distribution range of 2 to 7. This relatively low conversion rate of 16 to 18 percent is ascribed to the fact that autoclave reactors typically must operate at relatively low temperatures and/or high feed temperatures to obtain polymers with these GPC-LALLS CDF fractions at given molecular weight distributions.

When using a combination of an autoclave and a tubular reactor, it is possible to provide polymers which are usable for cast or blown film applications (Mw/Mn between 2 to 7), shrink film applications, blend applications with other natural or synthetic polymers, crosslinking applications with or without being blended with other natural or synthetic polymers, and injection molding applications, depending on the reaction conditions. Polymers suitable for these applications can be obtained by controlling the temperature in the two autoclave reaction zones at between 140 and 220° C., while the inlet temperature of the monomer feed streams for both reaction zones is between 0 and 110° C., preferably between 0 and 80° C., more preferably between 0 and 40° C.; and by controlling a maximum temperature in the tubular reactor at a value of between 160 and 360° C., while the initiation temperature in the tube is between 120 and 200° C. The polymer product obtained in such a process, preferably between 3 and 12 wt. percent monomer, based on the total amount of monomer introduced in the reactor, is polymerized in the autoclave reactor and preferably between 10 and 15 wt. percent of the monomer is polymerized in the tubular reactor, has a melt index of between 0.15 and 2000, preferably between 0.15 and 20, more preferably between 0.2 and 8 g/10 minutes. The conversion rate of the monomer described in the examples are 17 to 24 wt. percent.

Products which can be blended or combined with these new LDPE polymers include conventional Ziegler-Natta ethylene polymers (for example, ethylene/$C_3$-$C_{20}$ alpha-olefin copolymers), metallocene ethylene and propylene polymers, including constrained geometry ethylene homo and copolymers (such as those described in U.S. Pat. No. 5,272,236, U.S. Pat. Nos. 5,278,272, and 5,665,800, the disclosures of each of which is incorporated herein in its entirety, other LDPE polymers, and mixed catalyst(s) and/or reactor(s) producing other ethylene and propylene polymers. Commercial examples of traditional Ziegler-Natta copolymers include DOWLEX (made by The Dow Chemical Company), SCLAIR and ASTUTE (both made by NOVA Chemical), and ESCORENE made by EXXON-MOBIL. Examples of some metallocene polyethylene suitable for blending with these resins include SURPASS by NOVA, EXACT and EXCEED (both by EXXON-MOBIL), AFFINITY made by DOW and ENGAGE made by DuPONT-DOW Elastomers. Other polymers that can be blended with the new LDPE include ethylene/vinyl acetate, ethylene/carboxylic acid copolymers (such as PRIMACOR by DOW, or NUCREL by DuPont, or ESCOR by Exxon-Mobil), polypropylene, polystyrene and other thermoplastic polymers. Ionomers such as SURLYN (by DuPont) can also benefit from blending with the new LDPE polymers.

When using an autoclave reactor containing at least one reaction zone, similar products can be prepared, albeit with a lower conversion rate of the monomers to be polymerized, by using the reaction conditions indicated in the previous paragraphs for the autoclave zones.

In another preferred embodiment, the process of the present invention is a high pressure process for the production of polyethylene resins where the autoclave reactor comprises at least two reaction zones, while the tubular reactor comprises at least one reaction zone with the temperature in the two autoclave reaction zones at between 160 and 200° C., while the inlet temperature of the monomer feed streams for both reaction zones is between 0 and 110° C., preferably between 20 and 80° C., more preferably between 30 and 80° C.; and by controlling a maximum temperature in the tubular reactor at a value of between 160 and 320° C., while the initiation temperature is between 120 and 190° C.

Figure 3:
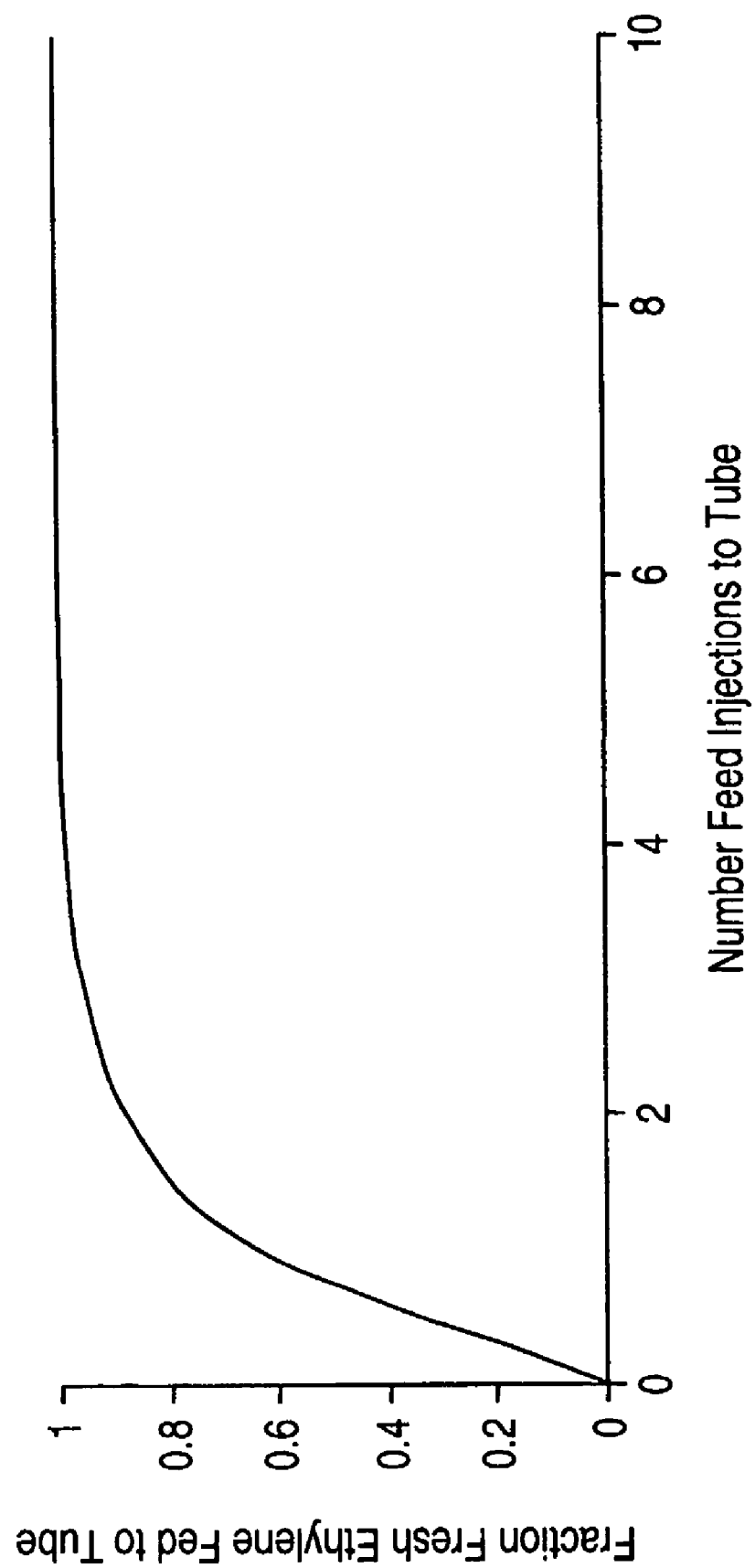
FIG. 3 is a plot of the maximum fraction of preferred monomer(s) that may be fed to the tube as a function of total number of monomer injections to the tube.

In a very preferred embodiment, the autoclave reactor comprises at least two reaction zones, while the tubular reactor comprises at least one reaction zone with the temperature in the two autoclave reaction zones at between 160 and 200° C., while the inlet temperature of the monomer feed streams for both reaction zones is between 0 and 110° C., preferably between 20 and 80° C., more preferably between 30 and 80° C.; and by controlling a maximum temperature in the tubular reactor at a value of between 160 and 320° C., while the initiation temperature is between 120 and 190° C. There are one or more monomer injections to the tubular section of the reactor where the monomer temperature is below that of the polymer/monomer mixture, preferably below 120° C., more preferably below 50° C., most preferably below 30° C. The monomer split to the tubular section of the reactor maximally follows $y=1-(0.35)^x$ where y is the total monomer injected into the tube as a fraction of total monomer feed and x is the total number of monomer injections into the tube. So, for 1 injection into the tube, the monomer split to the tube will be no greater than 0.65. FIG. 3 below is a plot of the maximum fraction of monomer(s) that may be fed to the tube as a function of total number of monomer injections to the tube in this preferred embodiment.

The polymer product obtained in such a process, preferably between 3 and 12 wt. percent monomer, based on the total amount of monomer introduced in the reactor, is polymerized in the autoclave reactor and preferably between 10 and 30 wt. percent of the monomer is polymerized in the tubular reactor, has a melt index of between 0.15 and 2000, preferably between 0.15 and 20, more preferably between 0.2 and 8 g/10 minutes.

In another very preferred embodiment of the process, the invention is a free radical initiation polymerization process for the preparation of ethylene polymers or copolymers, comprising reacting ethylene and optionally one or more comonomers at a high pressure, conveniently between 13,000 psig and 100,000 psig, and at reactor temperatures of 115° C. to 400° C., preferably 125-400° C., more preferably 140-350° C., especially 165-320° C., while the inlet temperature of the monomer feed streams for all reaction zones is between 0 and 110° C., preferably between 0 and 80° C., more preferably between 0 and 40° C., especially between 0 and 30° C. The reactor system comprising at least one tubular, and at least one autoclave reactor, wherein the monomer(s) feed into the reactors is divided into multiple monomer feed streams, and wherein at least one feed stream into the tubular reactor consists essentially of unreacted monomer. Preferably the autoclave and tubular reactor are operated in series in that sequential order, wherein the maximum monomer feed stream split to the tubular reactor is defined by $y=1-(0.35)^x$ wherein y represents the maximum feed fraction to the tubular reactor and x represents the total number of feeds to the tubular reactor, especially wherein each monomer feed stream is at a temperature lower than the reactor temperature.

The invention is further illustrated by means of the following, non-limiting examples.

EXAMPLE 1

In a stirred two zone reaction autoclave reactor followed by a single reaction zone tubular reactor, ethylene is polymerized under the following steady state conditions:

Reactor pressure: 26,400 psig;

Autoclave reactor residence time: around 30 sec

Tubular reactor residence time: around 30 sec

Tert-butyl peroxypivalate (TBPV) is injected as free radical initiator in each autoclave reactor zone.

At the beginning of the reaction zone of the tubular reactor, additional free radical initiator is injected comprising of tert-butyl peroxy-2-ethylhexanoate (TPO), tert-butyl peroxy acetate (TPA) and di tert butyl peroxide (DTBP).

Temperature process conditions:

Autoclave top-zone (half of the reactor feed to first autoclave zone): inlet 75° C., control 193° C.

Autoclave bottom-zone (half of the reactor feed to second autoclave zone): inlet 75° C., control 193° C.

Tube control: 282° C.

Tube initiation 184° C.

As chain transfer agent, propylene is used in an amount of 1.1 wt percent (of the total feed to the reactor) in the reactor monomer feed stream equally divided over both autoclave reaction zones.

In this continuous process, low density polyethylene for blown film applications is obtained with an ethylene conversion rate of about 20 percent. The polymer product has a MI of about 2 g/10 minutes and a density of about 0.922 g/cm$^3$. The polymer is measured to have a Mw/Mn value of about 6, melt strength of 9 cN, GPC-LALLS CDF of 0.39. So in this case in the equation y≧0.0663x−0.015, wherein y=GPC-LALLS CDF and x=Mw/Mn measured by conventional GPC, y=0.39 which is greater than 0.3828 and a line drawn from where the LS chromatogram intersects with molecular weight 350,000 and molecular weight 1,150,000 has a positive slope of 26.48. The polymer contains no additives.

EXAMPLE 2

In a stirred two zone reaction autoclave reactor followed by a single reaction zone tubular reactor, ethylene is polymerized under the following steady state conditions:

Reactor pressure: 26,000 psig;

Autoclave reactor residence time: around 30 sec

Tubular reactor residence time: around 30 sec

Tert-butyl peroxypivalate (TBPV) is injected as free radical initiator in each autoclave reactor zone.

At the beginning of the reaction zone of the tubular reactor, additional free radical initiator is injected comprising of tert-butyl peroxy-2-ethylhexanoate (TPO), tert-butyl peroxy actetate (TPA) and di tert butyl peroxide (DTBP).

Temperature process conditions:

Autoclave top-zone (half of the reactor feed to first autoclave zone): inlet 70° C., control 174° C.

Autoclave bottom-zone (half of the reactor feed to first autoclave zone): inlet 35° C., control 184° C.

Tube control: 280° C.

Tube initiation 182° C.

As chain transfer agent, isobutane is used in an amount of 2.8 wt. percent in the reactor monomer feed stream equally divided over both autoclave reaction zones.

In this continuous process, polyethylene for blown film applications is obtained with an ethylene conversion rate of about 21 percent. The polymer product has a MI of about 2 g/10 minutes and a density of about 0.928 g/cm$^3$. The polymer is measured to have a Mw/Mn value of about 4.57, melt strength of about 8 cN, GPC-LALLS CDF of 0.32, which is greater than 0.288 and a line drawn from where the LS chromatogram intersects with molecular weight 350,000 and molecular weight 1,150,000 has a positive slope of 1.13. The polymer contains no additives.

EXAMPLE 3

In a stirred two zone reaction autoclave reactor followed by a single reaction zone tubular reactor, ethylene is polymerized under the following steady state conditions:

Reactor pressure: 26,400 psig;

Autoclave reactor residence time: around 30 sec

Tubular reactor residence time: around 30 sec

Tert-butyl peroxypivalate (TBPV) is injected as free radical initiator in each autoclave reactor zone.

At the beginning of the reaction zone of the tubular reactor, additional free radical initiator was injected comprising of tert-butyl peroxy-2-ethylhexanoate (TPO), tert-butyl peroxy actetate (TPA) and di tert butyl peroxide (DTBP).

Temperature process conditions:

Autoclave top-zone (half of the reactor feed to first autoclave zone): inlet 77° C., control 174° C.

Autoclave bottom-zone (half of the reactor feed to first autoclave zone): inlet 75° C., control 174° C.

Tube control: 248° C.

Tube initiation 163° C.

As chain transfer agent, isobutane is used in an amount of 2.7 wt percent in the reactor monomer feed stream equally divided over both autoclave reaction zones.

In this continuous process, polyethylene for blown film applications is obtained with an ethylene conversion rate of 17 percent. The polymer product has a MI of 1.5 gms/10 minutes and a density of 0.93 g/cm$^3$. The polymer is measured to have a Mw/Mn value of 4.7, melt strength of 10 cN, GPC-LALLS CDF of 0.34, which is greater than 0.2966 and a line drawn from where the LS chromatogram intersects with molecular weight 350,000 and molecular weight 1,150,000 has a positive slope of 36.33. The polymer contains no additives. FIG. 4 graphically depicts the light scattering response (LS response) versus log molecular weight (by gel permeation chromatography (GPC)) for Examples 1, 2 and 3.

EXAMPLE 4

In a stirred two zone reaction autoclave reactor followed by a single reaction zone tubular reactor, ethylene is polymerized under the following steady state conditions:

Reactor pressure: 26,400 psig;

Autoclave reactor residence time: around 30 sec

Tubular reactor residence time: around 30 sec

Tert-butyl peroxypivalate (TBPV) is injected as free radical initiator in each autoclave reactor zone.

At the beginning of the reaction zone of the tubular reactor, additional free radical initiator is injected comprising of tert-butyl peroxy-2-ethylhexanoate (TPO), tert-butyl peroxy actetate (TPA) and di tert butyl peroxide (DTBP).

Temperature process conditions:

Autoclave top-zone (half of the reactor feed to first autoclave zone): inlet 74° C., control 193° C.

Autoclave bottom-zone (half of the reactor feed to second autoclave zone): inlet 83° C., control 193° C.

Tube control: 282° C.

Tube initiation 176° C.

As chain transfer agent, propylene is used in an amount of 0.9 wt percent (of the total feed to the reactor) in the reactor monomer feed stream equally divided over both autoclave reaction zones.

In this continuous process, low density polyethylene for blown film applications is obtained with an ethylene conversion rate of about 19 percent. The polymer product has a MI of about 0.74 g/10 minutes and a density of about 0.9227 g/cm$^3$. The polymer is measured to have a Mw/Mn value of about 5.48, melt strength of 15 cN, GPC-LALLS CDF of 0.425. So in this case in the equation y≧0.0663x−0.015, wherein y=GPC-LALLS CDF and x=Mw/Mn measured by conventional GPC, y=0.425 which is greater than 0.3483 and a line drawn from where the LS chromatogram intersects with molecular weight 350,000 and molecular weight 1,150,000 has a positive slope of 58.94.

COMPARATIVE EXAMPLE 1

Comparative example 2 is ExxonMobil LDPE LD156BW having a melt index of 0.26 g/10 minutes and a density of 0.9218 g/cm$^3$ and a Mw/Mn of 4.93. So in this case in the equation y≧0.0663x−0.015, wherein y=GPC-LALLS CDF and x=Mw/Mn measured by conventional GPC, y=0.3331 which is greater than 0.3119 and a line drawn from where the LS chromatogram intersects with molecular weight 350,000 and molecular weight 1,150,000 has a negative slope of −43.93.

COMPARATIVE EXAMPLE 2

Comparative example 2 is DSM LDPE 2200TC00 having a melt index of 0.73 g/10 minutes and a density of 0.9236 g/cm$^3$ and a Mw/Mn of 5.56. So in this case in the equation y≧0.0663x−0.015, wherein y=GPC-LALLS CDF and x=Mw/Mn measured by conventional GPC, y=0.3355 which is less than 0.3536 and a line drawn from where the LS chromatogram intersects with molecular weight 350,000 and molecular weight 1,150,000 has a positive slope of 73.97.

FIG. 5 graphically depicts the light scattering response (LS response) versus log molecular weight (by gel permeation chromatography (GPC)) for Examples 2 and 4, as well as comparative examples 1 and 2.

FIG. 6 graphically depicts the laser light scattering (LALLS) cumulative detector fraction (CDF) versus molecular weight distribution (GPC) for Examples 1-4 as well as comparative examples 1 and 2.

Product Applications

End use products made using the new LDPE's include all types of films (for example, blown, cast and extrusion coatings (monolayer or multilayer)), molded articles (for example, blow molded, rotomolded and pultruded articles, wire and cable coatings/formulations, cross-linking applications, foams (for example, blown with open or closed cells) and other thermoplastic applications.

What is claimed is:

1. An ethylene homo or copolymer prepared in a high pressure radical initiated process using a chain transfer agent selected from the group consisting of saturated and unsaturated hydrocarbons, wherein the homo or copolymer is characterized as having long chain branching and having a molecular weight distribution, Mw/Mn, and a GPC-LALLS CDF, which satisfies the following relationship: y≧0.0663x−0.015, wherein y=GPC-LALLS CDF and x=Mw/Mn measured by conventional GPC; wherein a line drawn from where the LS chromatogram intersects with molecular weight 350,000 and molecular weight 1,150,000 has a positive slope; and wherein a film comprising the ethylene homo or copolymer has a microgel content of less than or equal to 3000 count, where microgels are defined as being in the range of 200-400 micron diameter gels per 50,000 square inches of film area.

2. The ethylene homo or copolymer according to claim 1, wherein the ethylene homo or copolymer has a melt index of from 0.15 to 2000 g/10 minutes, wherein the melt index is determined in accordance with ASTM D1238 condition (E) (190° C., 2.16 kg).

3. The ethylene homo or copolymer according to claim 1 having a GPC Mw and a zero shear viscosity ($\eta_0$) (Pa*s) relationship of log($\eta_0$ (Pa*s))≦3.6607*log(GPC Mw)−14.678.

4. The ethylene homo or copolymer according to claim 1 having a melt strength of greater than or equal to about 75*(melt index)$^{-0.6}$, wherein the melt index is determined in accordance with ASTM D1238 condition (E) (190° C., 2.16 kg).

5. The ethylene homo or copolymer according to claim 1 having a melt strength of greater than or equal to about 9.5*(melt index)$^{-0.6}$, wherein the melt index is determined in accordance with ASTM D1238 condition (E) (190° C., 2.16 kg).

6. The ethylene homo or copolymer according to claim 1 having a melt strength of greater than or equal to about 11.5*(melt index)$^{-0.6}$, wherein the melt index is determined in accordance with ASTM D1238 condition (E) (190° C., 2.16 kg).

7. The ethylene homo or copolymer according to claim 1 having a molecular weight distribution of between 2 and 7.

8. The ethylene homo or copolymer according to claim 5 having a molecular weight distribution of between 4 and 7.

9. The ethylene homo or copolymer of claim 1 in which the molecular weight distribution, Mw/Mn, and GPC-LALLS CDF satisfies the following relationship: y≧0.0663x−0.005.

10. The ethylene homo or copolymer of claim 1 in which the molecular weight distribution, Mw/Mn, and GPC-LALLS CDF satisfies the following relationship: y≧0.0663x−0.025.

11. The ethylene homo or copolymer according to claims 1, 9, or 10, wherein the polymer has a melt index of from 0.15 to 20 g/10 minutes, wherein the melt index is determined in accordance with ASTM D1238 condition (E) (190° C., 2.16 kg).

12. The ethylene homo or copolymer according to claims 1, 9, or 10, wherein the polymer has a melt index of from 0.2 to 8 g/10 minutes, wherein the melt index is determined in accordance with ASTM D1238 condition (E) (190° C., 2.16 kg).

13. The ethylene homo or copolymer according to claims 1, 9, or 10, wherein the polymer has a density of from 0.91 g/cm$^3$ to 0.935 g/cm$^3$.

* * * * *